3,294,525
FUSION PROCESSES FOR THE MANUFACTURE OF METALS AND ALLOYS EMPLOYED IN CONTACT WITH MOLTEN MATERIALS
Roger Lacroix, Suresnes, and Henri Blavat, Cachan, France, assignors to Comptoir Lyon-Alemand Louyot & Cie, Paris, France
No Drawing. Filed Mar. 11, 1963, Ser. No. 264,061
Claims priority, application France, Mar. 30, 1962, 892,931
12 Claims. (Cl. 75—10)

The present invention relates to an improvement in fusion processes for the manufacture of metals and alloys, especially of platinum and platinum alloys, which are employed in the construction of appliances and metallic components which are in contact with molten materials, especially in the manufacture of glass products.

The invention is more especially concerned with processes for the fabrication of spinnerettes employed in production of glass fibers, crucibles for the fusion of optical glass, feed channels or nozzles, furnace elements and other components which are intended to be placed in contact with molten glass at high temperature.

The invention is even more especially concerned, among such processes, with those which make use of platinum and the other platinoids, especially in the form of the so-called metallic sponges produced as a result of the calcination of salts which are the final stages of refining, for example, the platinum which is obtained by pyrolysis of the chloroplatinate of ammonium $(NF_4)_2[PtCl_6]$, the rhodium obtained by pyrolysis of the chloride of rhodium chloropentamine $[RhCl(NH_3)_5]Cl_2$, etc., these metallic sponges being melted, in most cases by induction, in crucibles of refractory material, then cast in ingots which are then converted into sheets or wires by means of known processes.

The main purpose of the invention is to make the said fusion processes of manufacture such that the appliances manufactured are thereby endowed with a distinctly longer working life by creating conditions which are as unfavorable as possible to the appearance of fissures or cracks in the metal.

The length of life of the metal or alloy is directly dependent on the solidity of the grain boundaries. Experience has shown that the presence of infinitesimal traces of impurities concentrated at the grain boundaries considerably reduced the solidity of these latter at high temperature. These impurities are most frequently derived from the dissociation of the refractory oxides in which platinum and its alloys are melted. At high temperatures above 1,769° C., which are necessary in order to melt platinum and platinum alloys, the refractory oxides, and even the most stable of these latter, undergo a certain dissociation which is represented by:

$$MeO \rightleftharpoons Me + \tfrac{1}{2}O_2$$

MeO represents the refractory oxide formed by the metal Me. Liberated metal Me dissolves in the molten metal as well as oxygen. The dissociation of the oxide is all the more pronounced as the temperature is higher. During the solidification of the metal, the oxide MeO forms again and collects preferably at the grain boundaries.

The oxide MeO can also form slowly during service as a result of the reaction between the dissolved metal Me and the oxygen derived from the surrounding atmosphere which gradually diffuses through the platinum or the platinum alloy and furthermore with greater ease at the grain boundaries.

According to the known laws which govern chemical equilibria, it can be seen that the reduction of the partial pressure of the oxygen in the melting furnace increases the dissociation of the refractory oxide and therefore the contamination of the molten metal by the metal Me.

Melting in vacuo or in a neutral gas, and particularly in the presence of reducing agents, is therefore to be avoided. Melting in air, or even better in pure oxygen either under atmospheric pressure or under higher pressure would be beneficial. In that case, however, another defect would appear: the oxygen would dissolve in the molten metal and would be partially given off upon solidification; the metal thus obtained would not be sound. This defect is particularly marked in the case of alloys having a high rhodium content which are difficult to obtain by melting in air without either flaws or airholes.

Experience has shown that the so-called sponge metal contained substantial quantities of gas which facilitated the dissociation of the oxides of the crucibles.

To draw practical conclusions from the foregoing remarks, the present invention consists mainly, at the same time as in previously compressing the metallic sponges, in eliminating gas from these latter by heating under a vacuum at a temperature which is lower than the melting point of the said sponges but which is as close as possible to this latter.

The invention further consists in the following feature which is preferably employed at the same time, whereby the metallic sponges which are compressed, especially in the shape of rods, either in suitable compression moulds or preferably by hydrostatic compression in flexible envelopes, are then de-gassed and sintered under a vacuum at high temperature, then melted under a vacuum without contact with crucibles by means of a vacuum arc furnace or electron bombardment furnace.

The invention will in any case become more readily apparent from a study of the complementary description which follows below and which, as will be understood, is given solely by way of indication and not in any sense by way of limitation.

In a first example of the process in accordance with the invention, a platinum alloy containing 10% by weight of rhodium is prepared by previous mixing of the metallic sponges, compression into cylinders, followed by sintering at 1700° C. in an induction furnace in which the pressure is maintained below $10^{-2}$ millimeters of mercury. This alloy is then melted in lime crucibles under a pressure of air of 10 centimeters of mercury, and then cast. The ingots thus obtained, which are very sound, make it possible to produce spinnerettes for glass fibers and crucibles for the fusion of optical glass having a service life which exceeds on the average three months of continuous service, namely twice the service life of those appliances which are constructed of platinum-rhodium alloy by the usual methods. The service life of glass furnace components exceeds six months.

In a second example of the process in accordance with the invention, a platinum alloy containing 10% by weight of rhodium is prepared by previous mixing of metallic sponges, compression into rods by hydrostatic pressure, sintering at 1600° C. under a pressure of $10^{-4}$ millimeters of mercury. The alloy is then arc-melted under a pressure of $10^{-3}$ millimeters of mercury.

Appliances such as spinnerettes or crucibles which are constructed of the said platinum-rhodium alloy have a continuous service life of over four months.

In a third example of embodiment of the process in accordance with the invention, consideration has been given to the use of platinum having a rhodium content of 20%, 30% or even 40% and which would accordingly constitute a very substantial progress in the manufacture of spinnerettes for the production of glass fibers and especially in the fabrication of the bases pierced with holes through which the molten glass filaments are forced. The edges of the said holes are subject to wear, become enlarged and the fibers increase in diameter and consequently lose their qualities of flexibility. The high rhodium-content alloys have a better resistance to wear and therefore permit of better manufacture over a longer period of time, but the formation of such alloys had hitherto remained difficult on account of their high melting point, higher than 1,880° C., and on account of the high solubility of oxygen in these fused alloys. The processes in accordance with the invention have made it possible to overcome these difficulties completely.

The metallic sponges of platinum and rhodium which are mixed in the requisite proportions are compressed into cylindrical rods by hydrostatic compression and sintered at 1,750° C. under a pressure of $10^{-4}$ millimeters of mercury. The said rods are then arc-melted under a pressure of $10^{-3}$ millimeters of mercury into ingots which, after rolling, provide the metal with which are formed the bases of spinnerettes for producing glass fibers.

It will naturally be understood that the invention is not limited in any sense to the examples of embodiment which have been described in the foregoing but is intended on the contrary to include within its scope all alternative forms.

What we claim is:

1. An improved process for the manufacture of platinoids to be employed in contact with molten materials comprising compressing said platinoid in the form of a sponge into an element, simultaneously sintering and degassing said compressed element by heating said element under vacuum at a temperature, which is lower than, but near, the melting point of said platinoid sponge and melting said sintered and degassed element under vacuum without contact with a crucible.

2. A method according to claim 1 in which sponges of platinum alloy are compressed into rods in compression moulds and said compressed rods are then degassed and sintered under vacuum at said temperature and then melted under vacuum without contact with a crucible.

3. A method according to claim 2 in which the compression into rods is effected by means of hydrostatic compression of the sponge platinoid metal in a flexible envelope.

4. A method according to claim 2 in which said melting is conducted by means of a vacuum arc furnace.

5. A method according to claim 2 in which said melting is effected by means of an electron bombardment furnace.

6. A method according to claim 1 in which the sponge comprises platinum.

7. A method according to claim 6 in whch the sponge comprises a platinum-10-40% rhodium alloy.

8. A method according to claim 7 in which the sponge comprises a platinum-10% rhodium alloy.

9. A method for the fusion manufacture of platinum devices comprising the steps of compressing into a cylinder particles of metal sponge comprising platinum-10-40% rhodium, sintering and simultaneously degassing said compressed cylinder at a temperature from about 1600° C.-1750° C. at a pressure of from about $10^{-2}$-$10^{-4}$ mm. of mercury and then melting said cylinder under vacuum without contact with a crucible in a vacuum arc furnace.

10. A method according to claim 9 in which the melting is conducted under a vacuum of 100-$10^{-4}$ mm. of mercury.

11. A method according to claim 9 in which the melted cylinder is cast into an ingot.

12. A method according to claim 11 in which the cast ingot is formed into a spinneret for molten glass.

References Cited by the Examiner

UNITED STATES PATENTS

| 2,205,854 | 6/1940 | Kroll | 75—84 |
| 2,541,764 | 2/1951 | Henes | 75—10 |
| 2,727,937 | 12/1955 | Boyer | 75—84 |
| 2,809,905 | 10/1957 | Davis | 75—65 |
| 2,824,794 | 2/1958 | Hathaway | 75—65 |
| 2,825,641 | 3/1958 | Beall | 75—84 |
| 2,876,094 | 3/1959 | Lusby | 75—84 |
| 2,904,411 | 9/1959 | Pfann | 75—10 |

FOREIGN PATENTS

| 615,147 | 12/1926 | France. |
| 755,835 | 8/1956 | Great Britain. |

OTHER REFERENCES

Hampel et al.: Rare Metals Handbook, 2nd ed., 1961, Reinhold Publishing Corporation, chapter 17 and p. 157.

Rhines: Non Ferrous Metallography Notes, Part III, pp. 49a–49g., 1953.

DAVID L. RECK, *Primary Examiner.*

BENJAMIN HENKIN, *Examiner.*

H. W. CUMMINGS, H. W. TARRING,
*Assistant Examiners.*